(12) United States Patent
Wolfsberger

(10) Patent No.: US 9,956,735 B2
(45) Date of Patent: May 1, 2018

(54) SEMI-FINISHED HONEYCOMB PART AND SANDWICH PART

(71) Applicant: MAGNA STEYR Fahrzeugtechnik AG & Co KG, Graz (AT)

(72) Inventor: Guenter Wolfsberger, Lieboch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 87 days.

(21) Appl. No.: 14/978,876

(22) Filed: Dec. 22, 2015

(65) Prior Publication Data

US 2016/0176140 A1    Jun. 23, 2016

(30) Foreign Application Priority Data

Dec. 22, 2014   (EP) .................................. 14199857

(51) Int. Cl.
*B29D 99/00* (2010.01)
*B32B 37/14* (2006.01)
(Continued)

(52) U.S. Cl.
CPC ...... *B29D 99/0089* (2013.01); *B29C 67/0048* (2013.01); *B29C 69/02* (2013.01); *B29C 70/68* (2013.01); *B29D 24/005* (2013.01); *B32B 3/12* (2013.01); *B32B 37/0007* (2013.01); *B32B 37/146* (2013.01); *B29K 2103/00* (2013.01); *B29K 2105/0872* (2013.01); *B29K 2105/25* (2013.01); *B29L 2031/30* (2013.01); *B32B 2038/0024* (2013.01); *B32B 2038/0056* (2013.01); *B32B 2250/03* (2013.01); *B32B 2305/076* (2013.01); *B32B 2310/04* (2013.01); *B32B 2310/0409* (2013.01); *B32B 2605/08* (2013.01)

(58) Field of Classification Search
CPC .......................... B29D 99/0089; B32B 37/146
See application file for complete search history.

(56) References Cited

U.S. PATENT DOCUMENTS 3,557,277 A * 1/1971 Brodersen et al. . B29C 67/0011
264/316
6,596,124 B2 * 7/2003 Hookham ............ B31D 3/0207
101/109

(Continued)

FOREIGN PATENT DOCUMENTS

CN          1080012 A      12/1993
CN          102712141 A    10/2012
(Continued)

OTHER PUBLICATIONS

Office Action for Japanese Patent Application No. 2015-247181, dated Nov. 8, 2016, 6 pages including 3 pages of English translation.

(Continued)

*Primary Examiner* — Liam J Heincer
(74) *Attorney, Agent, or Firm* — Jordan IP Law, LLC; Todd A. Vaughn

(57) ABSTRACT

A method for producing a semi-finished honeycomb-core product for producing a sandwich component, a method for producing a sandwich component, a semi-finished honeycomb-core product, a sandwich component, and the use thereof as a component of a motor vehicle.

11 Claims, 3 Drawing Sheets

Figure 1:
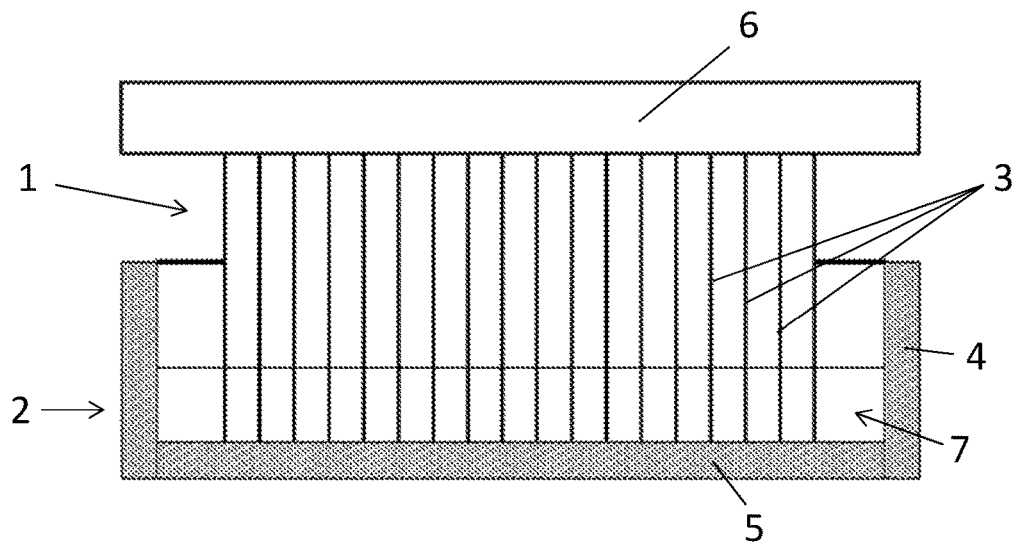

(51) Int. Cl.
*B29C 67/00* (2017.01)
*B29C 69/02* (2006.01)
*B32B 3/12* (2006.01)
*B29D 24/00* (2006.01)
*B32B 37/00* (2006.01)
*B29C 70/68* (2006.01)
*B29K 103/00* (2006.01)
*B29K 105/00* (2006.01)
*B29L 31/30* (2006.01)
*B29K 105/08* (2006.01)
*B32B 38/00* (2006.01)

(56) References Cited

U.S. PATENT DOCUMENTS

| | | | |
|---|---|---|---|
| 2002/0086912 A1 | 7/2002 | Hookham et al. | |
| 2010/0310820 A1* | 12/2010 | Wiegersma | B31D 3/0238 428/116 |
| 2013/0056134 A1* | 3/2013 | Masuda | B28B 11/12 156/89.22 |
| 2015/0050446 A1* | 2/2015 | Stamp | B29C 43/52 428/73 |

FOREIGN PATENT DOCUMENTS

| | | | | |
|---|---|---|---|---|
| DE | 102004015472 B4 | 3/2010 | | |
| DE | 102010005456 A1 | 7/2011 | | |
| DE | 10255039 B4 | 6/2012 | | |
| DE | 102012006609 A1 | 10/2013 | | |
| DE | 102013013419 A1 | 3/2014 | | |
| GB | 2277709 A | * 11/1994 | ......... | B29C 67/0044 |
| JP | S60-49144 A | 3/1985 | | |
| JP | S62-71426 U | 5/1987 | | |
| JP | H1-51331 B | 11/1989 | | |
| JP | H10-123009 A | 5/1998 | | |
| JP | 3408933 B2 | 5/2003 | | |
| JP | 2006-118550 A | 5/2006 | | |
| JP | 2013517162 A | 5/2013 | | |
| JP | 2013237242 A | 11/2013 | | |

OTHER PUBLICATIONS

Notice of Reasons for Rejection for Japanese Patent Application No. 2015-247181, dated Jun. 13, 2017, 6 pages including 3 pages of English translation.

Office Action for Korean Patent Application No. 10-2015-0182532, dated Mar. 31, 2017, 8 pages including 2 pages of English translation.

Office Action for Chinese Patent Application No. 201510430841.0, dated Sep. 1, 2017, 9 pages including 5 pages of English translation.

Office Action for Japanese Patent Application No. 2015-247181, dated Oct. 3, 2017, 6 pages including 3 pages of English translation.

* cited by examiner

SEMI-FINISHED HONEYCOMB PART AND SANDWICH PART

CROSS-REFERENCE TO RELATED APPLICATIONS

The present application claims priority 35 U.S.C. § 119 to European Patent Publication No. EP14199857.5 (filed on Dec. 22, 2014), which is hereby incorporated by reference in it complete entirety.

TECHNICAL FIELD

Embodiments relates to a method for producing a semi-finished honeycomb-core product for producing a sandwich component, a method for producing a sandwich component, a semi-finished honeycomb-core product, a sandwich component, and the use thereof as a component of a motor vehicle.

BACKGROUND

It is known practice to use sandwich components having honeycomb cores in automotive construction, for example as the bonnet of a motor vehicle. These sandwich components may be used as outer skin parts in visible regions of a vehicle and in the process form what are referred to as Class A surfaces which may be identified by an observer.

Outer skin parts having for example paper as the sandwich core material usually exhibit, following sandwich pressing for shaping the component, core impressions or component corrugations on the surface, i.e. on an outer layer, which reproduce the contours of the webs of the paper core. This is also known as the "telegraphing effect". This has a striking effect on the quality of the surface and can subsequently be concealed only with a great deal of effort by way of coating layers or other complicated treatment processes.

SUMMARY

Embodiments relate to a method for producing a semi-finished honeycomb-core product for producing a sandwich component, and a method for producing a sandwich component, which at least reduces core impressions on an outer layer of the sandwich component.

Embodiments relate to a semi-finished honeycomb-core product and a sandwich component having fewer or no core impressions on a surface, and also the use thereof as a component of a motor vehicle.

In accordance with embodiments, a method for producing a semi-finished honeycomb-core product for producing a sandwich component, comprises: providing a honeycomb core; moistening the honeycomb core at least in a deformation portion or region of the webs of the honeycomb core; and crumpling the honeycomb core at least in the deformation portion or region.

In accordance with embodiments, a method for producing a semi-finished honeycomb-core product for a motor vehicle, comprising: providing a honeycomb core having a plurality of webs; moistening the honeycomb core at least in a deformation region of the webs; and crumpling the honeycomb core at least in the deformation region.

In accordance with embodiments, a method for producing a sandwich component for a motor vehicle, comprising: providing a honeycomb core having a plurality of webs; moistening the honeycomb core at least in a deformation region of the webs; crumpling the honeycomb core at least in the deformation region; applying outer layers to the ends of the honeycomb core, wherein the outer layers are composed of fibre composite material, or semi-finished fibre material.

In accordance with embodiments, a sandwich component for a motor vehicle, comprising: a honeycomb core having a plurality of webs, wherein the honeycomb core is moistened at least in a deformation region of the webs, and the deformation region is crumpled; and outer layers arranged at each end region of the honeycomb core In accordance with embodiments, a honeycomb core, such as, for example, a paper honeycomb core, is pre-treated such that, during subsequent use as the core of a sandwich component and compression of the sandwich component, fewer or no core impressions at all arise on a visible surface of the component. This is achieved in that at least one portion or region of the webs, i.e., a layer or plane of the honeycomb core, is first of all moistened and crumpled in the moistened state and thus weakened ("pre-crushing").

As a result of the moistening, local softening of the webs is achieved. In this state, the webs are then collapsed at least in portions or regions so that they preferably form a bellows-like structure in portions or regions. Preferably only said portion or region of the webs gets crumbled and the remaining portions or regions of the webs do not get crumbled. As a result of this preforming, and thus, weakening of the webs, during subsequent compression in a sandwich component, the webs yield more easily to the pressure, and thus, web impressions on the outer layer are reduced.

In order to be able to produce a finished sandwich component via the semi-finished honeycomb-core product, a matrix, for example an adhesive, or initially dry fibre material is preferably subsequently applied to the crumpled honeycomb core, or already pre-impregnated semi-finished fibre products (prepregs) are laid on the core or the latter is encapsulated therewith.

The deformation portion or region is preferably located in an end region of the webs of the honeycomb core, i.e., in a peripheral zone of the honeycomb core. This peripheral zone may be used subsequently in a manner bearing against an outer surface of a sandwich component having this honeycomb core.

In accordance with embodiments, the moistening is carried out by the honeycomb core being dipped into a liquid-filled container. The container can have, for example, a liquid level of about 0.5-5 mm, depending on the respective core thickness and the desired extent of preforming. Alternatively, other types of moistening, for example by spraying with a liquid, would be possible.

In accordance with embodiments, the crumpling is carried out by the honeycomb core being pushed against a planar surface.

In accordance with embodiments, the honeycomb core does not get deformed, apart from the crumbling itself, and thus, gets its desired form only afterwards, after the attachment of outer layers.

In accordance with embodiments, the planar surface may be the bottom of the container.

In accordance with embodiments, the pushing of the honeycomb core, in particular, against the bottom of a container, may be carried out via a planar component, in which the planar component is to bear against one end of the honeycomb core. The planar component may be, for example, a cover. In this way, it is possible to exert a desired pressure evenly on the honeycomb core.

In accordance with embodiments, the honeycomb core is dried following the crumpling, in particular, before being processed further, for example, to form a sandwich component. For instance, the honeycomb core is dried before the attachment of outer layers.

In accordance with embodiments, the liquid for moistening the honeycomb core may be water-based, or acid-based, or base-based, or alcohol-based. It is favourable for the liquid used to have low surface tension and to evaporate quickly.

In accordance with embodiments, a method for producing a sandwich component comprises: producing a semi-finished honeycomb-core product as described herein; applying outer layers to the ends of the honeycomb core, i.e., to the top and bottom of the honeycomb core, wherein the outer layers are composed of fibre composite material or semi-finished fibre material.

In accordance with embodiments, the core may be coated or encapsulated with fibre material, i.e., fibre composite material, or semi-finished fibre material, on the top and the bottom with said fibre material protruding.

In accordance with embodiments, the fibre material may already contain or not yet contain a matrix, and the matrix may also be a material that is composed of two or more components, such as resin with curing agent. In this case, it is also possible to use plastics material or synthetic resin, to which small fibre tufts have already been admixed, and this is thus applied to the paper cores as an outer layer.

If fibre material or semi-finished fibre material is used, the outer layers can each are composed of one or more fibre material/semi-finished fibre material layers or plies.

The fibre plies or the fibre material may be composed of woven fabrics, laid fabrics, knits, grids, mats and/or non-wovens. Examples of the fibres used are natural fibres (for example flax fibres, hemp, bamboo, etc.), glass fibres or carbon fibres, ceramic fibres, textile fibres, synthetic fibres etc.

In accordance with embodiments, once the outer layers have been applied to the honeycomb core, the outer layers, particularly when a dry fibre material is used, are impregnated, sprayed and/or wetted with a PUR matrix.

In accordance with embodiments, thermoplastic or thermosetting plastics materials are used as the matrix material.

In accordance with embodiments, rather than with a dry semi-finished fibre material, the honeycomb core can also already be coated or encapsulated on the top side and underside with a semi-finished fibre material pre-impregnated with a matrix (prepreg), for example a thermoplastic or thermosetting plastics material.

In accordance with embodiments, it is also possible to apply a still liquid fibre composite material, mixed with short fibres, in order to create an outer layer.

In accordance with embodiments, the liquid for moistening the honeycomb core prior to crumpling can also be similar or identical to the matrix material subsequently used in the production of the sandwich component, for example, isocyanate, or an ester of isocyanic acid when a PUR matrix material is used. In this case, it is advantageous not to allow the honeycomb core to dry before a further application of the matrix material.

In accordance with embodiments, after the outer layers have been applied, the sandwich component is compressed in a moulding tool in order to obtain a desired shape. The compression may be carried out such that deformation of the sandwich component occurs primarily in the deformation portion or region of the honeycomb core.

In accordance with embodiments, honeycomb cores may have honeycomb-shaped or wave-shaped arrangements, or have any other conceivable honeycomb shape, for example round, rectangular, square, trapezoidal and polygonal, these (within a honeycomb core) not having to be regularly repeating shapes.

In accordance with embodiments, suitable materials for the honeycomb core are paper, or board, or other cellulose-based materials.

In accordance with embodiments, a semi-finished honeycomb-core product comprises a honeycomb core crumpled and weakened in a deformation portion or region, at one end of webs of the honeycomb core, wherein the webs are deformed in a bellows-like manner in a layer of the honeycomb core that forms a peripheral zone.

In accordance with embodiments, a sandwich component is produced as described herein, and thus, has a honeycomb core which is crumpled in a deformation portion or region, wherein the deformation portion or region is an end region of webs of the honeycomb core.

In accordance with embodiments, such a sandwich component may be used as a planar component of a motor vehicle, in particular as a bonnet, door, roof, tailgate, loading floor, covering, vehicle floor, or torsion box.

In accordance with embodiments, the deformation portion or region is to bear against that outer layer of the sandwich component that forms the visible outer side of the sandwich component.

DRAWINGS

Embodiments will be illustrated by way of example in the drawings and explained in the description below.

FIGS. 1-4 schematically illustrate a method for producing a semi-finished honeycomb-core product, in accordance with embodiments.

Figure 5:
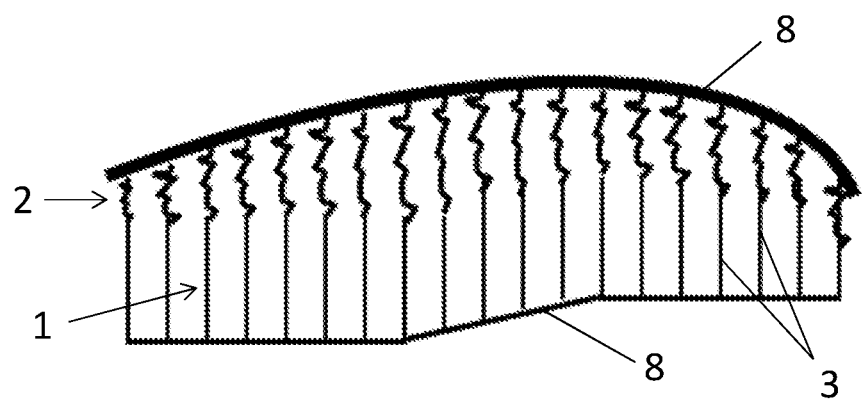

FIG. 5 schematically illustrates a sandwich component having a honeycomb core, in accordance with embodiments.

DESCRIPTION

FIGS. 1-4 illustrate the steps in a method for producing a semi-finished honeycomb-core product.

As illustrated in FIG. 1, a side of a honeycomb core 1, composed of a plurality of webs 3, that faces a subsequent outer side is inserted, at a deformation portion or region 2, into a liquid bath in a container 4 container liquid 7. The container 4, for example, may be, a trough or a basin. The deformation portion or region 2 of the honeycomb core 1 is dipped such that the webs 3 at the deformation portion or region 2 are moistened. As a result of penetration of the liquid 7, the webs 3 soften at the deformation portion or region 2. The liquid 7 has low surface tension and evaporates quickly, and is similar or identical to one of the subsequent matrix components, for example isocyanate in PUR matrix systems. The liquid level is between 0.5 and 5 mm. The dwell time in the liquid 7 may be selected, for example, in a manner dependent on the web thickness.

Figure 2:
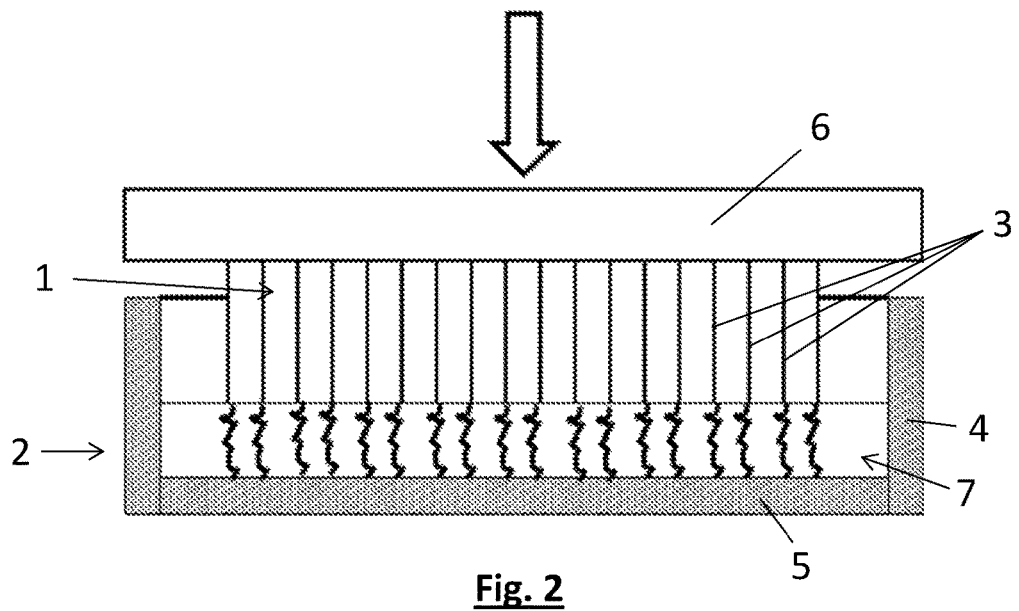

As illustrated in FIG. 2, the honeycomb core 1 is then pushed or otherwise manipulated from above against the bottom 5 of the container 4, via a cover 6. In this case, a force in the direction of the indicated arrow is exerted, said force crumpling the honeycomb core 1 in the moistened deformation portion or region 2. The honeycomb core 1 collapses in this peripheral zone by local softening and in dependence on the stroke path of the cover 6. The honeycomb core 1 may remain in this state for a predetermined period of time.

Figure 3:
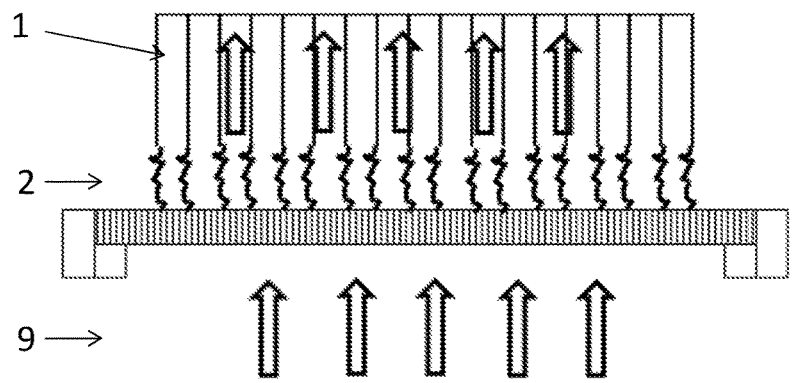
Figure 4:
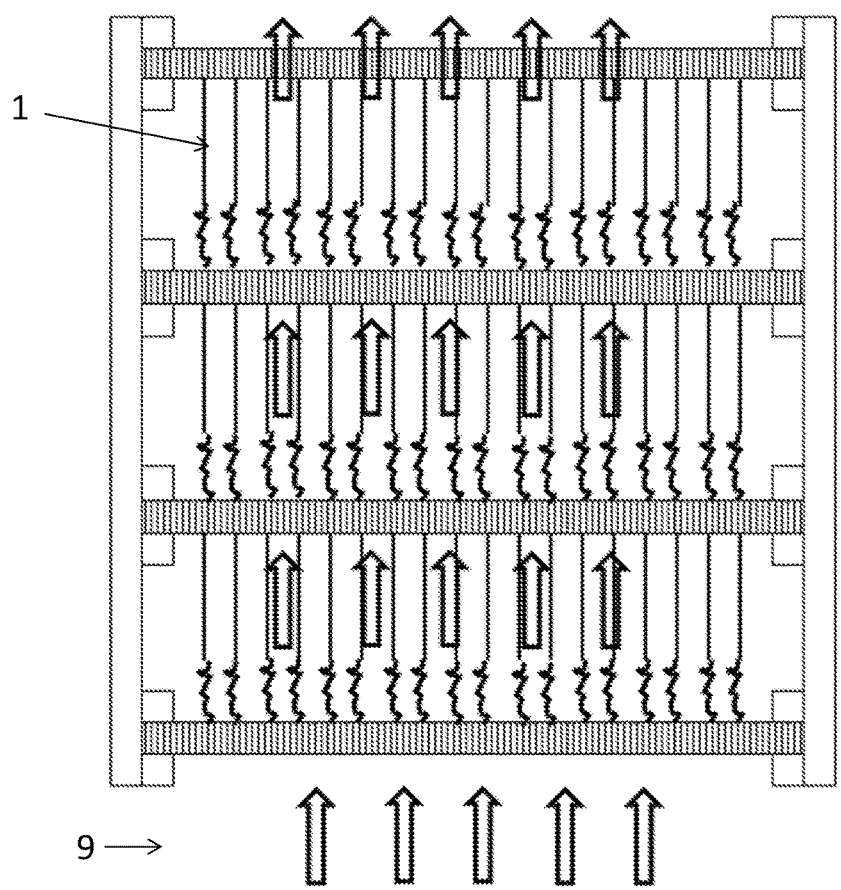

As illustrated in FIGS. 3 and 4, subsequently, the cover 6 is removed and the honeycomb core 1 is removed from the container 4. The honeycomb core 1 is dried when use is made of a liquid 7 that does not correspond to the matrix used. In this case, the honeycomb core 1 may, initially, turn drip off for a particular dwell time (FIG. 3) and then fully dry, introduced into a drying device which specifies a particular crumpling height (FIG. 4). The arrows illustrated in FIG. 3 and FIG. 4 in each case represent an air flow 9. When use is made of matrix components in the liquid bath 7, a shorter drying time or no drying time at all is necessary. Any drying time that is required may in this case be adapted to a subsequent processing process, for example reduced, and may thus be variable.

This produces a semi-finished product for further processing to form a sandwich component, in which that side of the honeycomb core 1 that is crumpled in this method is oriented towards the subsequent visible side, for example, when the sandwich component is used in automotive construction.

FIG. 5 illustrates such a sandwich component, having a honeycomb core 1 between two outer layers 8. The deformation portion or region or region 2 of the honeycomb core 1 bears against that outer layer 8 that is subsequently used as the visible outer side. The illustrated sandwich component has already been brought into a predetermined form by pressing. The sandwich component has only minor or no core impressions at all, particularly at the outer layer 8 which is adjacent to the deformation portion or region or region 2.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Honeycomb core
2 Deformation portion or region
3 Webs
4 Container
5 Surface
6 Planar component
7 Liquid
8 Outer layer
9 Air flow

What is claimed is:

1. A method for producing a semi-finished honeycomb-core product for a motor vehicle, comprising:
   providing a honeycomb core having a plurality of webs;
   moistening the honeycomb core at least in a deformation region of the webs by dipping the honeycomb core into an acid-based liquid contained within a container; and
   crumpling the honeycomb core at least in the deformation region by pressing the honeycomb core against a bottom surface of the container while the honeycomb core is dipped into the liquid contained within the container.

2. The method of claim 1, wherein the deformation region is located at an end region of the webs.

3. The method of claim 1, wherein the pressing the honeycomb core comprises bearing one end of the honeycomb core against a planar component.

4. The method of claim 1, further comprising, drying the honeycomb core after crumpling the honeycomb core.

5. The method of claim 1, wherein the semi-finished honeycomb-core product comprises a sandwich component.

6. The method of claim 1, wherein:
   the honeycomb core has longitudinal sides opposite each other; and
   from among the longitudinal sides, only one of the longitudinal sides is moistened during the moistening and deformed during the crumpling.

7. A method for producing a semi-finished honeycomb-core product for a motor vehicle, comprising:
   providing a honeycomb core having a plurality of webs;
   moistening the honeycomb core at least in a deformation region of the webs by dipping the honeycomb core into an alcohol-based liquid contained within a container; and
   crumpling the honeycomb core at least in the deformation region by pressing the honeycomb core against a bottom surface of the container while the honeycomb core is dipped into the liquid.

8. A method for producing a sandwich component for a motor vehicle, comprising:
   providing a honeycomb core having a plurality of webs;
   moistening the honeycomb core at least in a deformation region of the webs by dipping the honeycomb core into at least one of acid-based liquid or an alcohol-based liquid contained within a container;
   crumpling the honeycomb core at least in the deformation region by pressing the honeycomb core against a bottom surface of the container while the honeycomb core is dipped into the liquid contained within the container; and
   applying outer layers to the ends of the honeycomb core, wherein the outer layers are composed of fibre composite material, or semi-finished fibre material.

9. The method of claim 8, wherein the liquid comprises an isocyanate when a PUR matrix material is used as the honeycomb core.

10. The method of claim 8, further comprising, after applying the outer layers, compressing the sandwich component in a moulding tool in order to obtain a desired shape.

11. The method of claim 8, wherein:
    the honeycomb core has longitudinal sides opposite each other; and
    from among the longitudinal sides, only one of the longitudinal sides is moistened during the moistening and deformed during the crumpling.

* * * * *